United States Patent [19]

Rockenschaub et al.

[11] Patent Number: 4,780,137
[45] Date of Patent: Oct. 25, 1988

[54] A PROCESS FOR PRODUCING A MIXED GAS

[75] Inventors: Walter Rockenschaub; Werner Kepplinger, both of Linz, Austria

[73] Assignee: Voest-Alpine Aktiengesellschaft, Austria

[21] Appl. No.: 58,137

[22] Filed: Jun. 4, 1987

Related U.S. Application Data

[62] Division of Ser. No. 795,090, Nov. 5, 1985, Pat. No. 4,690,387.

[30] Foreign Application Priority Data

Nov. 19, 1984 [AT] Austria .................. 3652/84

[51] Int. Cl.$^4$ .............................................. C21C 7/00
[52] U.S. Cl. ........................................ 75/59.1; 75/25; 266/90; 266/144; 266/156; 266/159
[58] Field of Search .................... 75/25, 26, 59.1; 266/144, 156, 159, 90

[56] References Cited

U.S. PATENT DOCUMENTS

| 2,547,685 | 4/1951 | Brassert | 75/26 |
| 2,894,831 | 7/1959 | Old | 75/26 |
| 3,364,009 | 1/1968 | Kemmetmuller | 75/25 |

FOREIGN PATENT DOCUMENTS 534088 9/1979 Australia .

Primary Examiner—Peter D. Rosenberg
Attorney, Agent, or Firm—Ostrolenk, Faber, Gerb & Soffen

[57] ABSTRACT

In a method of producing a mixed gas from a process gas of a continuously working gasifier and a discontinuously incurred off-gas of an oxygen blowing converter, the off-gas of the refining process having the lower pressure is sucked into the process gas of the gasifier with the higher pressure via a gas jet ejector. The process gas serves as power gas, and subsequently the mixed gas is dedusted. A plant for producing steel includes a plant for recovering pig iron formed by a reduction shaft furnace and a melt-down gasifier, and at least one oxygen blowing converter for converting the pig iron into steel. The reduction shaft furnace has a process or top gas duct system, the converter has a converter off-gas duct, and an ejector connects both, the converter off-gas thus being feedable into the top gas duct system to form the mixed gas. Common dedusting and washing devices are provided for the mixed gas and safety devices for preventing oxygen from entering into the mixed gas.

6 Claims, 1 Drawing Sheet

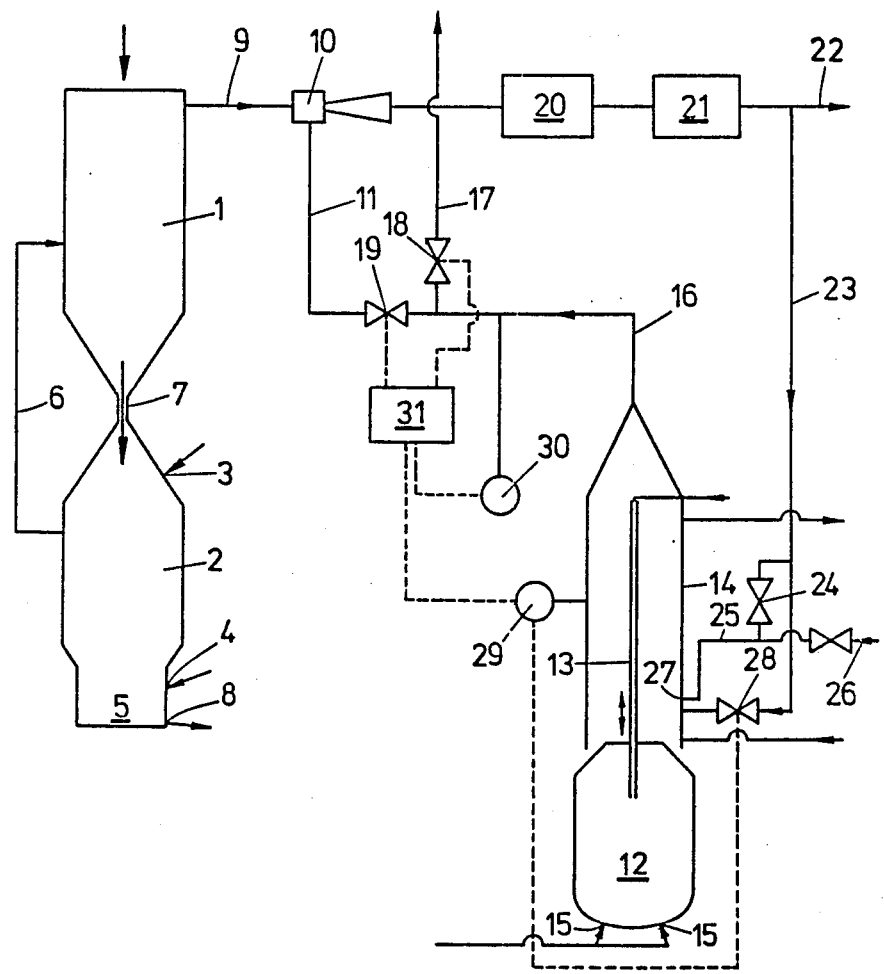

A PROCESS FOR PRODUCING A MIXED GAS

This is a division of application Ser. No. 795,090, filed 11/5/85, now U.S. Pat. No. 4,690,387.

BACKGROUND OF THE INVENTION

1. Field of the Invention

The invention relates to a method of producing a mixed gas from the process gas of a continuously operating gasifier and a discontinuously accruing off-gas of an oxygen blowing converter, e.g. during a process for refining pig iron with oxygen, as well as to a plant for carrying out this method.

In particular, this invention is designed for metallurgical plants having reduction and melt-down gasification furnaces for recovering pig iron as well as refining furnaces for converting pig iron into steel.

Normally, separate means for collecting, dedusting and deacidifying are necessary for the accruing process gases, e.g., for the reduction gas or top gas from the reduction plants, and for the converter off-gases. This is because the top gas originating from the reduction plant has a higher pressure, approximately from 2 to 5 bar, and a temperature of from 300° to 400° C., while the converter off-gas has a lower pressure of 0.01 bar and a temperature of approximately 1100° C. Usually it is complex to use the converter off-gases with respect to their content of chemical energy (CO-content and $H_2$-content). Therefore, in many cases these gases are burned off, thus causing a burden on the environment.

2. Description of the Related Art

According to Australian Pat. No. 540,666 it is already known to feed refinery gases from low pressure systems into a heating gas network operated at a higher pressure, wherein the refinery gases are compressed to the higher pressure prevailing in the heating gas network in a gas jet compressor by using the gases derived from the refinery and intended for the heating gas network as power gas and subsequently admixing them. This system is not suited for low pressure gases which, when occurring discontinuously, may contain oxygen.

SUMMARY OF THE INVENTION

The invention aims at avoiding the disadvantage described and has as its object to combine continuously accruing high-pressure process gases with discontinuously accruing low pressure converter off-gas. This is done without necessitating a compression of the low pressure gas with a blowing engine and without requiring complex storage means so that the mixed gas formed by the continuously accruing process gas and the discontinuously accruing converter off-gas can be delivered directly to consumers.

With a method of the initially defined kind, this object is achieved according to the invention in that the low pressure off-gas of the refining process is sucked into the process gas of the gasifier having the higher pressure via a gas jet ejector the process gas serves as power gas, and the mixed gas subsequently is subjected to dedusting and, if desired, to a $CO_2$-washing.

Advantageously, the top gas was generated with a pressure of from 2 to 5 bar, from a plant for recovering pig iron from iron oxide containing and carbon containing starting material. The plant comprised a reduction shaft furnace and a melt-down gasifier. Possibly, the off-gas of a number of oxygen blowing converters operating alternately is fed into the top gas network.

Also blast furnace gas may be used as process gas.

Preferably, the off-gas of the steel converter(s) is checked with respect to its oxygen content prior to its sucking into the process gas.

Furthermore, the invention comprises a plant for the production of steel. The plant comprising a reduction shaft furnace and a melt-down gasifier for the recovery of pig iron from iron oxide and carbon containing starting materials and at least one oxygen blowing converter for converting the pig iron into steel. The invention makes useful the process gases forming therein. The plant is characterized in that the top gas duct system of the reduction shaft furnace is connected with the off-gas duct(s) of the converter(s) via an ejector through which the converter off-gas is fed into the top gas duct. Common dedusting and washing means are provided for the mixed gas formed by the top gas and the converter off-gas, and that safety means are provided for preventing the entry of oxygen into the mixed gas.

BRIEF DESCRIPTION OF THE DRAWINGS

The method according to the invention and a plant usable for carrying it out are schematically illustrated in the drawing.

DETAILED DESCRIPTION OF THE PREFERRED EMBODIMENTS

A reduction shaft furnace 1 is continuously top-charged with granular iron oxide containing material from a storage container. The reduction shaft furnace is integrally connected with a melt-down gasifier 2. This melt-down gasifier has an introduction duct for coal-like material at 3 and an introduction duct for oxygen-containing gas at 4. The lower part 5 of the melt-down gasifier is designed as a collecting container.

The reduction gas formed in the melt-down gasifier from the coal-like material and the oxygen is supplied to the reduction shaft furnace 1 via duct 6, where the iron oxide containing material is reduced to iron sponge. The iron sponge is conveyed through a delivery means 7 into the melt-down gasifier, where—possibly by forming a fluidized bed—it is superheated, carburized and melted. Molten pig iron and slag collect in lower part 5 and are drawn off via a tap hole 8.

From the upper part of the reduction shaft furnace the reaction gas, the so-called "top gas", is drawn off through duct 9, and has a temperature of from 300° to 400° C. and a pressure of from 2 to 5 bar. The top gas flows through ejector 10 as power gas and sucks in converter off-gas from duct 11. The converter off-gas is formed in oxygen blowing converter 12 when converting pig iron into steel; the conversion is effected by top-blowing and/or injecting oxygen by means of a liftable and lowerable oxygen blowing lance 13 and/or bottom nozzles 15.

The mouth of the converter is connected with a fixed off-gas cooling chimney 14 via a water-cooled chimney hood. The converter off-gas flows off from the upper part of the off-gas cooling chimney 14 through duct 16, having a temperature of from approximately 900° to 1100° C. and a pressure of approximately 0.01 bar.

Into the duct 16 a blow-off duct 17 is incorporated, in which a separate closing means 18 is installed. In the sucking-in duct 11 as the continuation of duct 16, there is also installed a separate closing means 19 after the branching off of the blow-off duct 17.

The mixed gas formed by sucking converter off-gas into the top gas is dedusted in a dedusting means 20 and possibly washed so as to be free from carbon dioxide in a washing means 21. Then it is delivered to consumers through duct 22. A branch duct 23 leads back to the converter and there has further branches. On the one hand, a mixed gas duct 25, via a valve 24, leads into the chimney where it feeds a pilot flame 27 together with air from the air duct 26; on the other hand, a mixed gas duct, via a mixed gas valve 28, also leads into the chimney directly below the mouth of the pilot gas flame.

Furthermore, additional safety devices are provided at the plant, namely two measuring instruments 29 and 30 as well as switch means 31. The measuring instrument 29 has an oxygen measuring spot within the chimney 14, the measuring instrument 30 has an oxygen measuring spot in the duct 16. As will be described in more detail later on, with these measuring instruments a possible oxygen content is detected, the closing means 18 and 19 being actuated in counteraction depending on the results so as to make sure that no oxygen gets into the sucking-in duct 11.

The method according to the invention shall now be explained in more detail by way of an example which was carried out in a plant schematically illustrated in the accompanying drawing.

Top gas having a composition of 45% of CO, 30% of $CO_2$, 15% of $H_2$, 8% of $H_2O$ and 2% of nitrogen, is continuously drawn off at a pressure of 4 bar and a temperature of 350° C. through duct 9 in an amount of 1250 $Nm^3$/min from a reduction melt-down gasifier furnace having a capacity of 40 t/h.

A 25 t oxygen blowing converter (crude steel output approximately 40 t per hour), produces an average amount of 48 $Nm^3$/min of converter off-gas having a composition of 15% of $CO_2$, 75% of CO and 10% of $N_2$, a pressure of 0.01 bar and a temperature of 1100° C., as a by-product of the production of steel. The duration of heat being 32 to 36 min, the oxygen blowing time, 14 to 16 min and the gas recovery time 10 to 12 min, i.e., the effective gas occurrence is 110 $Nm^3$/min during the gas recovery time when refining.

The pig iron to be converted in the converter is taken from the melt-down gasifier having a carbon content of approximately 3%.

From the ratios of amounts listed, there results the following composition of the mixed gas:

| | |
|---|---|
| 644 $Nm^3$ CO = | 47 % CO |
| 392 $Nm^3$ $CO_2$ = | 29 % $CO_2$ |
| 188 $Nm^3$ $H_2$ = | 14 % $H_2$ |
| 100 $Nm^3$ $H_2O$ = | 7 % $H_2O$ |
| 36 $Nm^3$ $N_2$ = | 3 % $N_2$ |
| 1360 $Nm^3$ mixed gas = | 100 % | if the 1250 $Nm^3$ of top gas/min listed are mixed with 110 $Nm^3$ of converter off-gas/min.

Accordingly the mixing ratio of CO:$H_2$ is only slightly changed relative to the original top gas composition and the variations in the composition of the mixed gas formed are very slight. Thus a gas reservoir is not necessary.

However, the discontinuous feeding of the converter off-gas into the top gas network requires, as has already been mentioned, precautions so as to prevent oxygen from entering the top gas network via the converter off-gas duct, that might bear the risk of explosions.

These safety means comprise:

(a) a pilot flame 27 arranged in the cooling chimney and fed by mixed gas and air;

(b) a mixed gas duct entering into the cooling chimney of the converter below the pilot flame 27 and having an on/off valve 28;

(c) a measuring instrument 29 provided in the cooling chimney 14 for measuring oxygen possibly present;

(d) a closing means 19 arranged in front of the ejector 10;

(e) a closing means 18 arranged in front of the closing means 19 in the flow direction of the converter off-gas;

(f) a second measuring instrument 30 for measuring an oxygen content possibly present before the closing means 18 and (g) a switch means 31 for actuating the closing means 18 and 19.

The functions of the safety means in the individual operation phases of the converter are the following:

The measuring instruments 29 and 30 allocated to the $O_2$-measuring spots may be activated and deactivated from a control stand. In the deactivated condition of the $O_2$-measuring spots, the closing means 19 is closed, the closing means 18 is open and the mixed gas valve 28 with on/off-function is closed. The pilot flame 27 is burning in all phases of operation.

In the activated condition, the $O_2$-measuring spot arranged in the cooling chimney is in engagement with the mixed gas valve via the measuring instrument 29 and furthermore with the closing means 19 and the blow-off duct 17 via the switch means 31.

The $O_2$-measuring spot arranged in front of the closing means 18 is only in engagement with the closing means 19 and the closing means 18 via the measuring instrument 30 and the switch means 31. The $O_2$-measuring spot connected with the measuring instrument 30 has a pure safety function, in case the measuring spot connected with the measuring instrument 29 should fail. If oxygen is indicated in the converter off-gas, the closing means 19 will be closed. The closing means 18 and the mixed gas valve 28 will be opened and kept open.

During blowing pauses the $O_2$-measuring spots are not activated. The closing means 19 is closed, the closing means 18 is open, the mixed gas valve 28 is closed, and the pilot flame 27 is burning. Air sucked in via the chimney mouth by the draft prevailing in the chimney 14 escapes via the blow-off duct 17.

After charging the converter, i.e. before the onset of blowing, the $O_2$-measuring spots are activated from the control stand. Due to the oxygen present in the off-gas system, the closing means 19 remains closed and the closing means 18 open. The mixed gas valve 28 is opened. Mixed gas enters the chimney and burns to $CO_2$ and $H_2O$ with the oxygen of the air of the environment entering at the converter mouth, ignition being effected by the pilot flame 27.

The oxygen present in the off-gas system is consumed in the burning. The heat developing therein is utilized in the off-gas cooling chimney 14. Now fresh oxygen is supplied to the converter from above by means of the blowing lance 13 and/or via the bottom nozzles 15.

As soon as no oxygen is indicated in the converter off-gas network, the closing means 19 is opened, and the closing means 18 and the mixed gas valve 28 are closed. The gas supply via the pilot flame 27 is maintained. When the gas amount decreases towards the end of blowing and oxygen again is indicated in the off-gas, the closing means 19 is closed and the closing means 18 and the mixed gas valve 28 are opened.

Thereupon, the $O_2$-measuring spots are deactivated again from the control stand, and the same condition as initially described for blowing pauses is reconstituted, i.e. the mixed gas valve 28 is closed again.

The method according to the invention may accordingly also be used for coupling high and low pressure off-gas systems of other metallurgical furnaces.

What we claim is:

1. In a refining process for refining pig iron with oxygen, said process having a lower pressure discontinuously incurred off-gas generated in an oxygen blowing converter for converting pig iron into steel and a higher pressure process gas generated in a continuously working gasifier, said process producing a mixed gas from said process gas of said continuously working gasifier and said discontinuously incurred off-gas of said oxygen blowing converter, the improvement comprising ejecting said discontinuously incurred off-gas of said oxygen blowing converter into said process gas of said gasifier via a gas jet ejector, and subsequently dedusting said mixed gas.

2. A method as set forth in claim 1, further comprising subjecting said mixed gas to a $CO_2$ washing.

3. A process as recited in claim 1, wherein said process gas is at a pressure of from 2 to 5 bar and said gasifier is a melt-down gasifier, and said melt-down gasifier includes a shaft furnace, said melt-down gasifier and shaft furnace recovering pig iron from iron oxide containing starting materials and carbon containing starting materials.

4. A process as recited in claim 3, wherein said discontinuously incurred off-gas is off-gas of a plurality of oxygen blowing converters working alternately, and said process gas is a network of process gases, said off-gas of said plurality of oxygen blowing converters being ejected into said network of process gases.

5. A process as recited in claim 1, wherein said process gas is produced in a blast furnace comprising said gasifier and a shaft furnace.

6. A process as recited in claim 1, further comprising monitoring said discontinuously incurred off-gas of said oxygen blowing converter for presence of oxygen prior to ejecting said discontinuously incurred off-gas into said process gas.

* * * * *